Oct. 13, 1942.    M. HALLEAD    2,298,479
MEANS FOR PREPARING COLLAPSIBLE TUBES FOR SEALING
Filed May 24, 1938
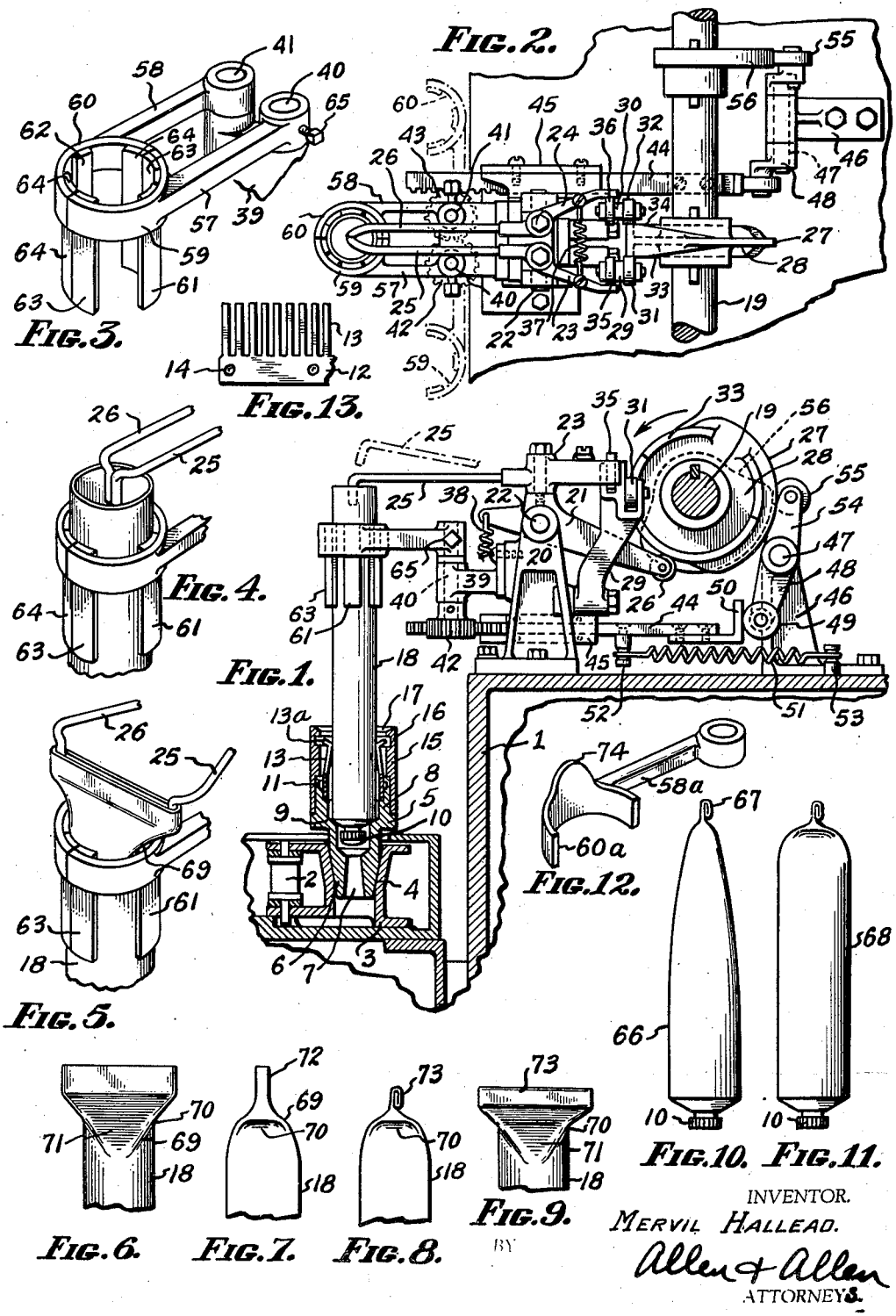
INVENTOR.
MERVIL HALLEAD.
BY Allen & Allen
ATTORNEYS.

Patented Oct. 13, 1942

2,298,479

UNITED STATES PATENT OFFICE 2,298,479

MEANS FOR PREPARING COLLAPSIBLE TUBES FOR SEALING

Mervil Hallead, Cincinnati, Ohio, assignor to The Karl Kiefer Machine Company, Cincinnati, Ohio, a corporation of Ohio Application May 24, 1938, Serial No. 209,765

9 Claims. (Cl. 113—1)

My invention has to do with the specific operation of spreading or fishtailing the ends of collapsible tubes after filling and prior to clamping and sealing. My invention can be employed in connection with any means or method in current use for effecting an end closure in collapsible tubes; but it was especially designed for and is of particular importance in connection with the sealing of collapsible tubes by welding, i. e., by interfusion of the juxtaposed tube walls.

In a co-pending application in my name and that of Paul R. Fechheimer, Ser. No. 174,079, filed Nov. 11, 1937, we have set forth a machine for the cleaning, filling and sealing of tubes, and in making a disclosure of my present invention, I shall describe it in connection with portions of the machine of the said co-pending application, it being understood however, that the utility of this invention is by no means confined to that machine.

In handling collapsible tubes, the tubes are arranged in holders on a conveyor in up-side-down position. One end of the tube is closed by the usual cap and is arranged downwardly, while the other end is open. In the machine to which I have referred, the tubes on the conveyor first come to a cleaning station where any foreign matter is removed by air. Next they pass to a filling station where a measured quantity of material is fed into each tube. Next they pass to a station where the tube ends are spread so as to fishtail them. Next they pass to a station where the spread ends of the tubes are clamped and where the tube ends are sheared to a uniform height. Next they pass to a welding station where the ends are again clamped and are welded by interfusion of the metal of the tube walls. Next, if desired, the tubes may pass to a folding station where the ends of the tubes are folded over upon themselves.

Though of some importance in any method of sealing the ends of collapsible tubes, it is of primary and fundamental importance in sealing tubes by welding, that the flattened ends of the tubes be free of any contamination by the tube contents. In the particular machine to which I have referred, the material is fed into the tubes at the filling station under pressure from a suitable spout. The material, even of viscous nature, packs well in the tubes. After the charge has been placed in each tube, the tube is lowered sharply, pulling it away from the spout and cleanly breaking the material, so that strings of it do not contaminate the portions of the tube walls left for sealing.

The spreading operation carried on on the tube walls, is a fairly rapid operation carried on preferably by a pair of fingers which are caused to enter the open end of the tube and then are drawn apart so as to fishtail the end. When the open end of the tube is free, the spreading or fishtailing of the tube walls produces a flattening of the tube elsewhere, so that the cross section of the tube becomes more and more sharply oval from the cap end to the open or bottom end. This causes the level of the material to rise in the tubes, and because the action is abrupt, this material is likely to become sprayed or spattered on the ends of the walls which are intended to be welded. For this reason it has been necessary to introduce into the tubes less material than they would otherwise hold, if satisfactory welding is to be regularly accomplished. Moreover, the tubes when completed have a spindly appearance and do not seem to be thoroughly filled.

It will be clear also that the tube itself must be larger and therefore more expensive than it would otherwise need be.

An object of my invention is to provide a means and method of treating collapsible tubes after filling, by spreading the walls thereof in such a way as not to displace the contents thereof, so as to cause the contents to contaminate the walls of the tube which are to be sealed by welding.

It is also an object of my invention to provide a simple though effective apparatus for this purpose.

It is a further object of my invention to provide an apparatus which is flexible in its operation to the extent at least that parts thereof do not have to be interchanged when tubes of the same diameter but of different heights are being filled.

Also it is an object of my invention to provide a mechanism of such character that the parts which must be interchanged when filling tubes of different diameters, are simple in character and few in number.

These and other objects of my invention which will be set forth hereinafter or will be apparent to one skilled in the art upon reading these specifications, I accomplish by that certain construction and arrangement of parts of which I shall now describe a certain exemplary embodiment, as applied to the machine of the said co-pending application.

Reference is made to the drawing wherein:

Figure 1 is a vertical elevation of my unit.

Fig. 2 is a top plan view thereof.

Fig. 3 is a perspective view of the means for embracing and holding the tube.

Fig. 4 is a similar perspective view of the embracing portion of the apparatus with the spreader fingers in position.

Fig. 5 is a similar view showing the tube end spread and the spreader fingers in their outermost position.

Fig. 6 is a side elevation of the end of a tube which has been spread in this manner.

Fig. 7 is an end elevation thereof.

Fig. 8 is an end elevation of a tube like that of Fig. 7, the end of which has been flattened, welded and turned over upon itself.

Fig. 9 is a side view of the tube of Fig. 8.

Fig. 10 is an end view of a tube which has been filled and sealed without the use of my invention.

Fig. 11 is the end of a tube which has been filled and sealed through the use of my invention.

Fig. 12 is a perspective view of an embracing member of another form which it is possible to use.

Fig. 13 is a plan view of a portion of a blank for forming the spring fingers in the holder.

In Figure 1, I have indicated at 1, the frame of the machine of the said co-pending application. This machine has a conveyor 2 mounted in a conveyor frame indicated generally at 3. For filling tubes of different lengths, the conveyor frame can be raised or lowered without disconnecting the conveyor drive. The conveyor is so constructed as to present sockets 4 in which tube holders may be mounted.

My tube holders comprise a body 5 having a neck 6 adapted to be engaged in the socket 4. The neck and the socket are preferably given a corresponding taper, so that the tube holders are frictionally retained therein. The holder body furthermore is perforated as at 7, for the reception of tube elevating means operating through the conveyor, ejector means and/or a portion of the mechanism whereby the filler device is rendered inoperative if no tube is in the holder.

The body 5 has an upper tubular portion 8 having a bore of such size as will accept the tube, a shoulder 9 upon which the shoulder of the tube rests, and a bore 10 to accept the cap. Near the upper end of the tubular portion 8 I provide an internal annular groove 11. A device presenting spring fingers is used for holding the tube. This device may be made of thin, springy sheet metal as shown in Fig. 13, and consists of a body portion 12, and a series of spring fingers 13. The metal strip illustrated in Fig. 13 is cut to length, bent to a circular form and inserted in the upper tubular portion 8 of the body of the holder. To maintain its position, a convenient way is to provide the body 12 with outwardly struck portions or bosses 14, which can engage as shown, in the annular groove 11.

A tubular cap portion 15 completes the tube holder. This member has a part which slips over or may be threaded on the tubular portion 8 of the tube holder body. Internally it has an annular groove 16. The entrance end of the member may be beveled as at 17, to facilitate the insertion of the tubes. The spring fingers 13 are bent slightly inwardly as shown; but their extreme ends are bent outwardly as at 13a to facilitate insertion of the tube, the outwardly bent portions being arranged so as to enter the annular groove 16.

When the tube 18 is inserted in this holder it will be seen that the shoulder of the tube rests against the shoulder 9, while the spring fingers 13 hold the tube in upright position and center it. It will furthermore be apparent that but one size of tube holder is required for any given diameter of tube, and also that since the tube is frictionally held, it may be located in a holder in such a way that the fishtailing of the ends and the ultimate sealing of the tube can bear any desired relationship to the indicia printed upon the tube.

While of especial importance in connection therewith, the utility of my tube holder is by no means confined to its employment with the other mechanisms herein described. My holder has the functions noted above, whether so employed or not. It has the further important function of permitting fishtailing of the ends of the tube without the formation of a peripheral indentation in the mid-section of the tube, such as would be formed if the tube were held in a closely fitting non-resilient holder.

The machine of the said co-pending application has a cam shaft 19 with means for driving this shaft in timed sequence to the operations which are being carried on. On bracket members 20 on the frame 1, I pivot a rocker 21 as at 22. To this rocker I pivot a pair of arms 23 and 24, which arms bear the spreader fingers 25 and 26. As the arm 21 is rocked about its pivot 22, the outer ends of the spreader fingers are raised and lowered to the positions shown respectively in solid and dotted lines in Figure 1. For this action, a cam follower 26 on the arm 21 bears against a peripheral cam surface 27, on a cam indicated generally at 28, and splined to or otherwise non-rotatably attached to the cam shaft 19.

For bringing about the spreading movement of the spreader fingers, I pivot a pair of arms 29 and 30 on the bracket members 20 as shown. These arms bear cam followers 31 and 32 which engage cam surfaces 33 and 34, formed on the sides of the cam plate 28. The arms 29 and 30 also bear small rollers or the like 35 and 36, which contact the ends of the arms 23 and 24. A tension spring 37 may be employed to urge the arms 23 and 24 toward each other, and may also serve, as will be clear, to keep these arms in contact with the rollers 35 and 36 on the arms 29 and 30, and to keep the cam followers 31 and 32 on these arms in contact with the cam surfaces 33 and 34. A coiled spring 38 engaging between an extension of the arm 21 and the base 1, serves to keep the cam follower 26 on the arm 21 on the peripheral cam surface 27. Thus it will be understood that the cam member 28 controls both the up and down movement of the spreader fingers and their spreader action, and that by properly forming the cam surfaces on the member 27, the desired sequential relationship of these movements is secured.

On a bracket means 39 which may be attached to the brackets 20, or otherwise fixed in position, I journal a pair of stub shafts 40 and 41. Each of these shafts bears a pinion 42 or 43, and these pinions are in mesh with each other.

A rack member 44 having teeth meshing with one of the pinions is slidably mounted in ways 45 on the base or on one of the brackets 20, and it will be clear that longitudinal movement of this rack will rotate both stub shafts 40 and 41 oppositely to each other. I mount a bracket 46 on the base and journal a stub shaft 47 therein. On one end of this stub shaft is a bell crank 48, carrying a roller 49, which bears against a shoe 50 on the rack 44. A coiled spring 51 engaged between a stud 52 on the rack, and a stud 53 on the frame 1, serves to urge the rack to the right in the several figures so as to keep the shoe 50 against the roller 49.

On the other end of the stub shaft I mount a crank arm 54 which bears a cam follower 55. This cam follower contacts the peripheral surface of a cam 56, which is splined or otherwise non-rotatably attached to the cam shaft 19. The tension spring 51 thus also serves to keep the cam follower 55 against the cam 56. The cam 56 is so shaped and positioned as to give the proper timed sequence to the operations of the shafts 40 and 41.

To the shafts 40 and 41 I attach arms 57 and 58. These arms bear semi-circular embracing means 59 and 60, which are adapted to surround the collapsible tube when the arms are in the position shown in solid lines in the several figures. When the rack 44 however, moves to the right in the several figures, the arms 57 and 58 assume the position shown in dotted lines in Fig. 2. When in this position they are completely out of the way of movement of tubes on the conveyor 2.

The embracing members 59 and 60 are provided with oppositely disposed members 61 and 62, in the form of longitudinally straight but laterally curved strips, which are welded or otherwise fastened to the members 59 and 61. Interspaced from the members 61 and 62, additional members 63 and 64 are attached to the embracing members 59 and 60. When these members are in the position shown in solid lines in the several figures, the members 63 and 64 lie adjacent each other. The members 61 to 64 inclusive, are so shaped as to embrace closely the end of a tube when that tube is in circular form.

While I have shown two members, it will be understood that more than two may be employed if desired; and that the embracing means may comprise members which come in from more than two directions.

Moreover in the claims which follow, by the term "embracing means" I do not intend to exclude means which in the aggregate do not wholly surround the tube. It is of advantage to support the tube at various points around its circumference, but certain of the advantages of the specific structures herein disclosed can be secured by the mere use of oppositely disposed controlling elements located in the line of the fishtail which is to be produced.

Since the conveyor 2 including the tube holder is movable, though the means just described are fixed, it will be apparent that the same embracing means may be employed for tubes of different lengths but of the same diameter. Where tubes of different diameters are to be handled, it is necessary to make a change in the members 57 and 58 and the parts attached thereto. To this end it is convenient to provide the members 57 and 58 with hubs which accept the ends of the shafts 40 and 41, and with set screws 65 or their equivalent, for the ready attachment and detachment of these arms.

The sequence of operations at the spreading station is as follows:

With the embracing members in the position shown in dotted lines in Fig. 2, a tube which has already been filled, is moved into position by means of the conveyor. Next through the operation of the cam 56 and associated parts, the embracing means are moved into a position to embrace the tube end with a portion of that end extending thereabove. The spreader fingers 25 and 26 which are now close together, are lowered into the position shown in Fig. 4. Next the spreader fingers 25 and 26 are drawn apart through the action of the cam means 33, 34 and associated parts, including the spring 37. This action spreads the tube. Upon its completion the spreader fingers 25, 26 are swung together and raised to the position shown in dotted lines in Fig. 1. Through the action of the cam 56 the rack 44 moves to the right and the embracing means are moved out of the way to the position shown in dotted lines in Fig. 2. The tube then moves on to the next station.

In Fig. 10, I have shown at 66 a tube which has been filled and closed without the use of my invention. It will be noted that the walls of the tube taper from the cap end 10 to the sealed end 67. This not only causes the tube to contain less material for any given length, but also through the action which has been described hereinabove is apt to cause such a displacement of the material in the tube as will foul the tube ends and prevent a satisfactory weld from being made.

In Fig. 11 at 68, I have shown a tube which has been filled and sealed through the use of my invention. It will be noted that this tube retains its circular formation substantially to the sealed end; that it has a better appearance and further that it will contain more material for a given length than the tube 66.

The manner in which this effect is accomplished is shown in Figs. 4 to 9 inclusive. In the direction in which the tube is to be spread by the fingers 25 and 26, the members 61 and 62 form fixed abutments so that the spreading action can take place only above the tops of these members. The members 61 to 64 inclusive, closely embrace the tube 18, minimizing distortion from the circular cross section. The transition from the circular cross section to the linear cross section is effected quite sharply; and is effected by slightly squaring the tube in the transition area. Thus what might be referred to as corner ridge portions 69, form on the tube; and the interspacing between members 61 and 63 and between members 62 and 64 allows the formation of these ridges.

It will be noted in Fig. 6 that the transition between the circular shape and the fishtail shape is made quite sharply at 70, near the ends of the fishtail, and that elsewhere as at 71, there is but a slight tapering only of the tube walls. If a cross section of the spread tube were taken approximately at the point 70, it would be rectangular in general contour. The depth of the ridge portions 69 of course increases up to the point 70, and beyond that point they tend to come together in the fishtailed portion 72.

In Fig. 8 I have shown a tube, the fishtailed portion 72 of which has been flattened by clamping. A seal has been effected by welding and the end of the tube has been turned over on itself one or more times, as at 73. A front view of the tube is shown in Fig. 9.

As I have indicated, modifications may be made in the embracing members. An additional possible form is indicated in Fig. 12, where the arm 58a is formed with an embracing member 60a, which closely fits the tube wall, and has an extension 74 which may be square or rounded as desired, and which does something of the work of the members 61 and 62 in the preferred construction which I have described.

Modifications may be made in my invention without departing from the spirit of it.

Having thus described my invention, what I claim as new and desire to secure by Letters Patent is:

1. In apparatus of the class described, a conveyor which can be raised or lowered, means on said conveyor for holding a collapsible tube accurately in axial position by engaging the tube adjacent its closed end, and a spreading head comprising spreading fingers adapted to enter the end of a tube, means for actuating said spreading fingers to move them apart, said head also including separable supporting means for contacting said tube and controlling the spreading action, and means for actuating said supporting means to cause it to embrace said tube.

2. In apparatus of the class described, a conveyor which can be raised or lowered, means on said conveyor for holding a collapsible tube accurately in axial position by engaging the tube adjacent its closed end, and a spreading head comprising spreading fingers adapted to enter the end of a tube, means for actuating said spreading fingers to move them apart, said head also including separable embracing means for contacting said tube and controlling the spreading action, and means for actuating said embracing means, said embracing means comprising members closely surrounding said tube when said tube is in circular form with an end of said tube projecting thereabove, said members acting to prevent substantial distortion of said tube excepting substantially in that portion thereof which extends above said embracing means.

3. In apparatus of the class described, a conveyor which can be raised or lowered, means on said conveyor for holding a collapsible tube accurately in axial position by engaging the tube adjacent its closed end, and a spreading head comprising spreading fingers adapted to enter the end of a tube, means for actuating said spreading fingers to move them apart, said head also including separable embracing means for surrounding said tube and controlling the spreading action, and means for actuating said embracing means, said embracing means comprising means surrounding said tube, and interspaced means within said last mentioned means and closely conforming to the surface of said tube when cylindrical in form, the interspacing between said last mentioned means permitting the formation of ridge portions in the upper part of said tube between said means during the spreading action.

4. In apparatus of the type described, spreading means, means for actuating said spreading means, separable embracing means operating in timed sequence with said first mentioned means for embracing a collapsible tube when it has a circular cross section, and for controlling the spreading of said tube during a spreading operation, and means for actuating said embracing means, said embracing means comprising means surrounding said tube, and interspaced means within said last mentioned means and closely conforming to the surface of said tube when cylindrical in form, the interspacing between said last mentioned means permitting the formation of ridge portions in the upper part of said tube between said interspaced means during the spreading action.

5. In apparatus of the class described, a machine base, a pair of shafts mounted in brackets thereon, arms on said shafts, embracing means on said arms for contacting a collapsible tube and controlling the flattening thereof, and means for actuating said shafts in opposite directions whereby to move said arms and embracing means to a position in which a collapsible tube is embraced thereby and to a position in which said tube is released and said arms and embracing means are moved out of the way of a path of travel of said tube, spreading means, and actuating means for said spreading means operating in timed sequence with said embracing means.

6. In apparatus of the class described, a machine base, a pair of shafts mounted in brackets thereon, arms on said shafts, embracing means on said arms for contacting a collapsible tube and controlling the flattening thereof, and means for actuating said shafts in opposite directions whereby to move said arms and embracing means to a position in which a collapsible tube is embraced thereby, and to a position in which said tube is released and said arms and embracing means are moved out of the way of a path of travel of said tube, said means comprising meshing pinions on said shafts respectively, a movable rack in mesh with one of said pinions and means for moving said rack in timed sequence to operations being carried on on said tube, spreading means, and actuating means for said spreading means operating in timed sequence with said embracing means.

7. In apparatus of the character described, a base, bracket means, a rocker arm mounted on said bracket means, a spreading device having a connection with said rocker arm, whereby to be raised and lowered thereby, a second bracket means, arms having embracing means for a collapsible tube mounted on said second bracket means, means for rotating said arms so as to bring them into a position where said embracing means embrace a collapsible tube, and into a position where said tube is released and said arms and embracing means are withdrawn from the path of travel thereof, a cam shaft, and means on said cam shaft for operating said rocker arm, said spreading device and said embracing device in timed sequence.

8. In apparatus of the character described, a base, bracket means on said base, a rocker arm horizontally pivoted on said bracket means, arms bearing spreader fingers vertically pivoted on said rocker arm, a second bracket means, arms bearing embracing means vertically pivoted thereon, a cam shaft, a peripheral cam thereon, said rocker arm having an extension contacting said peripheral cam, a second pair of rocker arms, a lateral cam means, said rocker arms contacting said lateral cam means and also said arms bearing spreading fingers, and additional cam means for moving said arms bearing said embracing means.

9. In apparatus of the character described, a base, bracket means on said base, a rocker arm horizontally pivoted on said bracket means, arms bearing spreader fingers vertically pivoted on said rocker arm, a second bracket means, arms bearing embracing means vertically pivoted thereon, a cam shaft, a peripheral cam thereon, said rocker arm having an extension contacting said peripheral cam, a second pair of rocker arms, a lateral cam means, said rocker arms contacting said lateral cam means and also said arms bearing spreading fingers, and additional cam means for moving said arms bearing said embracing means, the means for moving said last mentioned arms comprising meshing pinions adapted to said arms, a rack meshing with one of said pinions, and a connection between said rack and said last mentioned cam means.

MERVIL HALLEAD.